United States Patent
Katsuma (10) Patent No.: US 8,169,697 B2
(45) Date of Patent: May 1, 2012

(54) SCREEN UNIT

(75) Inventor: Ryoji Katsuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/040,574

(22) Filed: Mar. 4, 2011

(65) Prior Publication Data

US 2011/0222150 A1 Sep. 15, 2011

(30) Foreign Application Priority Data

Mar. 10, 2010 (JP) ................................. 2010-052832

(51) Int. Cl.
G03B 21/56 (2006.01)
G03B 21/58 (2006.01)
(52) U.S. Cl. ........................................ 359/443; 359/461
(58) Field of Classification Search .................. 359/443, 359/460, 461; 160/377; 156/60, 91
See application file for complete search history.

(56) References Cited

U.S. PATENT DOCUMENTS

| | | | | |
|---|---|---|---|---|
| 1,277,948 | A * | 9/1918 | Newgass | 4/273 |
| 4,984,871 | A * | 1/1991 | Martinez | 359/443 |
| 5,604,632 | A * | 2/1997 | Sawai | 359/443 |
| 6,297,905 | B1 | 10/2001 | Takamoto et al. | |
| 7,460,299 | B2 * | 12/2008 | Ogawa et al. | 359/443 |
| 7,770,314 | B2 * | 8/2010 | Dean | 40/624 |
| 7,864,418 | B2 * | 1/2011 | Kuroi et al. | 359/443 |
| 2009/0316260 | A1 * | 12/2009 | Howes | 359/443 |

FOREIGN PATENT DOCUMENTS

| | | |
|---|---|---|
| JP | 3-282442 | 12/1991 |
| JP | 2000-131766 A | 5/2000 |
| JP | 2006-154854 A | 6/2006 |

OTHER PUBLICATIONS

Kikuchi Science Laboratory Inc., Instruction Manual of Grandview Projection Screen.*
Kikuchi Science Laboratory Inc, Instruction Manual of Grandview Projection Screen.

* cited by examiner

*Primary Examiner* — Clayton E Laballe
*Assistant Examiner* — Kevin Butler
(74) *Attorney, Agent, or Firm* — AdvantEdge Law Group, LLC (57) ABSTRACT

A screen unit includes: a rectangular screen; fixing assist members provided on the screen along two opposed sides of the screen; first supporting units fixed to two sides of the screen different from the two opposed sides along which the fixing assist members are provided; second supporting units fixed to the screen via the fixing assist members; a first tensioning unit which applies tension in the direction of separating the first supporting units away from each other; and a second tensioning unit which applies tension in the direction of separating the second supporting units away from each other.

9 Claims, 8 Drawing Sheets

SCREEN UNIT

CROSS-REFERENCE

The entire disclosure of Japanese Patent Application No. 2010-052832, filed Mar. 10, 2010 is expressly incorporated by reference herein.

BACKGROUND

1. Technical Field

The present invention relates to a screen on which an expanded display image produced by a projector is projected, and more particularly to a screen unit which is easy to assemble and has high flatness sufficient for displaying an image projected by a projector without distortion.

2. Related Art

Recently, a close projection type (short focus type) projector which projects an image from a position close to a screen has been put on the market, and the chance of projecting an expanded image on a screen by using this type of projector has been increasing. This close projection type projector which can be placed at a position close to a screen unlike a related-art projector which projects an image from a position away from the screen and thus occupies a wide area on the desk, for example. Moreover, a person who goes across the front of the projector and thus becomes an obstacle for projection of an image in case of the related-art projector does not pass through the front of the close projection type projector. Therefore, the close projection type projector has high usability.

According to the close projection type projector, however, the projected image is largely distorted when the surface of the screen has low flatness and has a wavy shape or other non-flat shapes. Incase of the related-art projector placed at a distant position from the screen and projecting an image approximately from the front, the incident angle of the projection image with respect to the normal line of the screen surface is small. Thus, the quality of the projection image scarcely deteriorates even when the screen has low flatness. According to the close projection type projector, however, the large incident angle of the projection image produces distortion on the projection image when the screen has low flatness, which considerably deteriorates the image quality.

JP-A-2006-154854 and JP-A-2000-131766 disclose examples of the screen having low flatness. According to screen units shown in JP-A-2006-154854 and JP-A-2000-131766, two sides of a rectangular screen different from two sides fixed by supporters are unfixed and free. The two unfixed free sides decrease the flatness of the screen when they are curled. Moreover, according to the technologies disclosed in JP-A-2006-154854 and JP-A-2000-131766, the supporters apply tension only in the direction of separating the fixed and opposed two sides away from each other. In this case, the internal stress within the plane of the screen does not become uniform, and the flatness decreases in a region where the internal stress is small and a region where the internal stress sharply changes. When the close projection type projector projects an image on a screen having low flatness as the screens disclosed in these references, the image quality considerably deteriorates.

JP-A-3-282442 proposes a technology which increases the flatness of a screen by tensioning all the four sides of the screen. However, this screen unit has a complicated structure and is difficult to assemble by a manufacturer or a user. Furthermore, according to the screen unit disclosed in this reference, expanding and contracting mechanisms using springs are included in supporters, which lowers the rigidity of the supporters. In this case, stresses are difficult to be uniformly given to the entire surface of the screen base material, and thus the flatness of the screen lowers.

SUMMARY

An advantage of some aspects of the invention is to provide a screen which can be easily assembled while securing sufficient flatness of the surface of the screen, and can be constructed with simple structure and produced at low cost.

A screen unit according to an aspect of the invention includes: a rectangular screen; fixing assist members provided on the screen along two opposed sides of the screen; first supporting units fixed to two sides of the screen different from the two opposed sides along which the fixing assist members are provided; second supporting units fixed to the screen via the fixing assist members; a first tensioning unit which applies tension in the direction of separating the first supporting units away from each other; and a second tensioning unit which applies tension in the direction of separating the second supporting units away from each other.

According to this screen unit, all the four sides of the rectangular screen are fixed by using the first supporting units and the second supporting units. Thus, the screen is not curled. Moreover, the screen is tensioned by the first tensioning unit in the direction of separating the first supporting units away from each other and by the second tensioning unit in the direction of separating the second supporting units away from each other (for all the four sides of the rectangular screen). In this case, uniform stresses are applied to the entire surface of the screen, which increases the flatness of the screen. Accordingly, an image having no distortion can be produced even when the image is projected by a close projection type projector.

It is preferable that the screen unit of the above aspect of the invention further includes first bar-shaped members. In this case, the first bar-shaped members penetrating through a plurality of first holes formed at least along one of the two sides of the screen to which the first supporting units are fixed are held by the first supporting units such that the first supporting units can be fixed to the screen. According to this structure, the first supporting units can be fixed to the screen without using an adhesive. Thus, the productivity increases.

In the screen unit of the above aspect of the invention, it is preferable that the first holes have opening shapes elongated in the tensioning direction of the second tensioning unit. According to this structure, the screen and the first supporting units can be separately expanded and contracted with the screen held by the first supporting units when tension is applied by the second tensioning unit or when a difference in expansion and contraction is produced between the screen and the first supporting units due to thermal expansion caused by temperature change. Thus, wrinkles are not produced on the screen surface.

In the screen unit of the above aspect of the invention, it is preferable that the first bar-shaped members are elastic bodies more easily deformable in the tensioning direction of the first tensioning unit than in the tensioning direction of the second tensioning unit. According to this structure, manufacturing tolerances of the first holes and the first supporting units or flexing of the first supporting units can be absorbed when the screen is tensioned by the first tensioning unit. Thus, uniform stresses can be applied to the screen.

In the screen unit of the above aspect of the invention, it is preferable that the fixing assist members are second bar-shaped members. In this case, the second bar-shaped members penetrating through a plurality of second holes formed along the two opposed sides of the screen to which the second supporting units are fixed are held by the second supporting units such that the second supporting units can be fixed to the screen. According to this structure, fixing of the second supporting units to the screen or separation of the second supporting units from the screen can be facilitated. Thus, easiness of assembly or storage increases.

In the screen unit of the above aspect of the invention, it is preferable that the second holes have opening shapes elongated in the tensioning direction of the first tensioning unit. According to this structure, the screen and the second supporting units can be separately expanded and contracted with the screen held by the second supporting units when tension is applied by the first tensioning unit or when a difference in expansion and contraction is produced between the screen and the second supporting units due to thermal expansion caused by temperature change. Thus, wrinkles are not produced on the screen surface.

In the screen unit of the above aspect of the invention, it is preferable that the second bar-shaped members are elastic bodies more easily deformable in the tensioning direction of the second tensioning unit than in the tensioning direction of the first tensioning unit. According to this structure, manufacturing tolerances of the second holes and the second supporting units or flexing of the second supporting units can be absorbed when the screen is tensioned by the second tensioning unit. Thus, uniform stresses can be applied to the screen.

In the screen unit of the above aspect of the invention, it is preferable that one of the fixing assist members has a first slip stopper provided on the screen and a second slip stopper provided on the second supporting unit. According to this structure, fixing of the second supporting units to the screen or separation of the second supporting units from the screen can be facilitated. Thus, easiness of assembly or storage increases.

In the screen unit of the above aspect of the invention, it is preferable that the first tensioning unit includes a first plate-shaped member. In this case, the first plate-shaped member has a first inclined portion, and the screen is tensioned by applying pressure to the first inclined portion. According to this structure, tension can be applied easily and securely at low cost in the direction of separating the first supporting units away from each other.

In the screen unit of the above aspect of the invention, it is preferable that the second tensioning unit includes a second plate-shaped member. In this case, the second plate-shaped member has a second inclined portion, and the screen is tensioned by applying pressure to the second inclined portion. According to this structure, tension can be applied easily and securely at low cost in the direction of separating the second supporting units away from each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
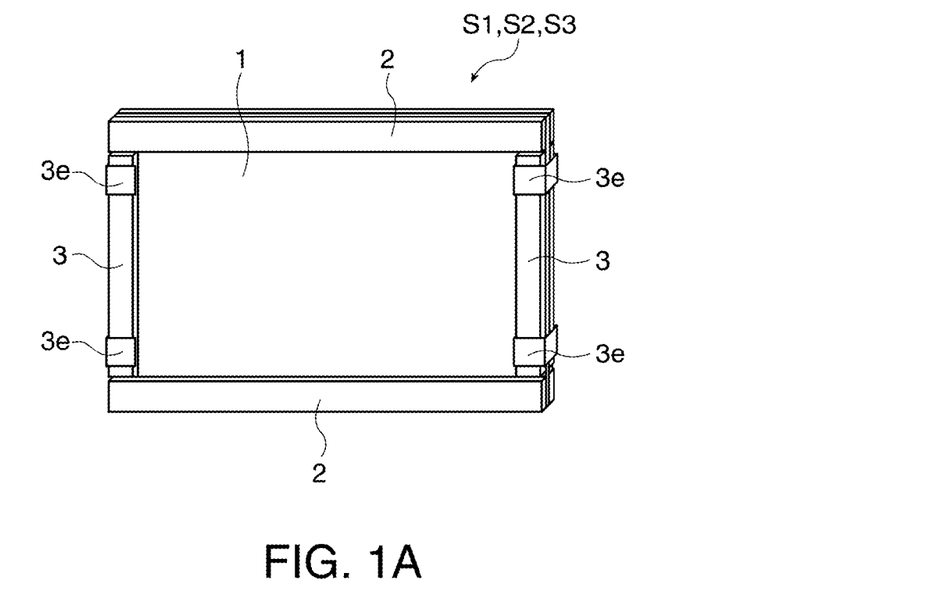
FIGS. 1A and 1B are perspective views schematically illustrating the structures of screen units according to first through third embodiments of the invention.
Figure 1B:
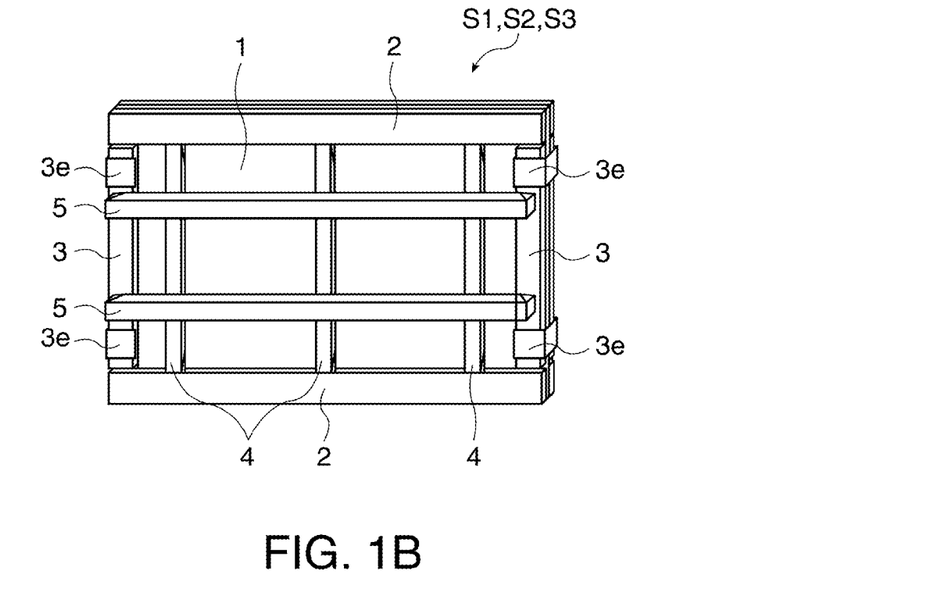
Figure 2:
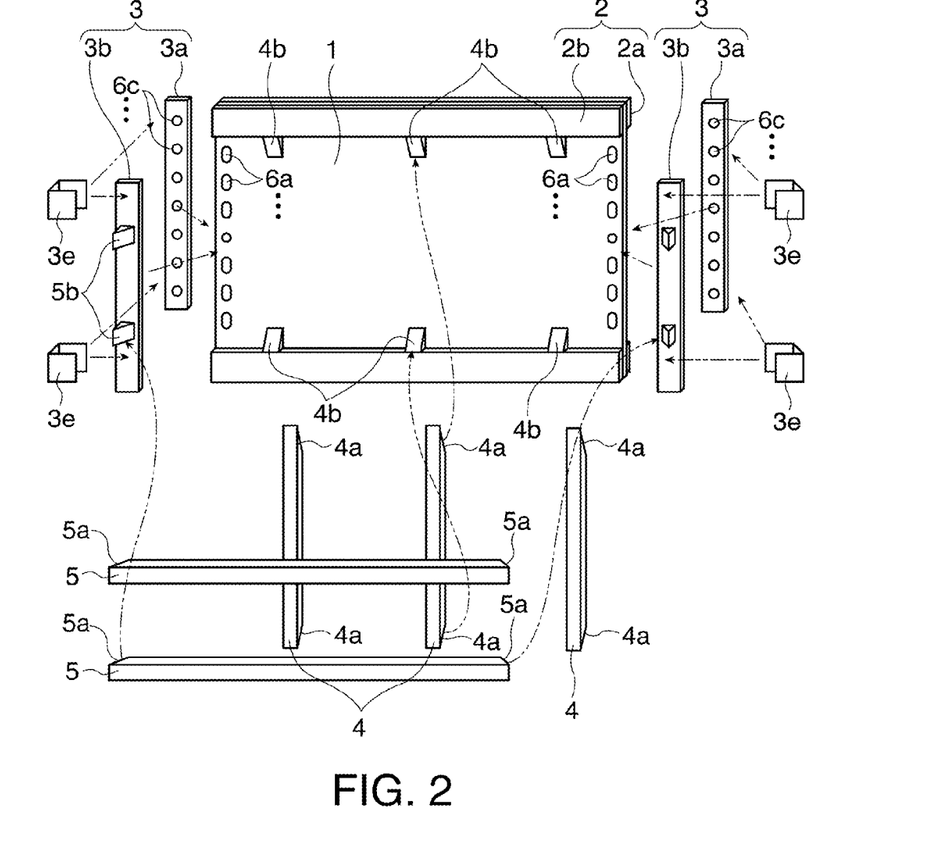
FIG. 2 is a perspective view schematically illustrating a disassembled condition of the screen unit according to the first embodiment.
Figure 3:
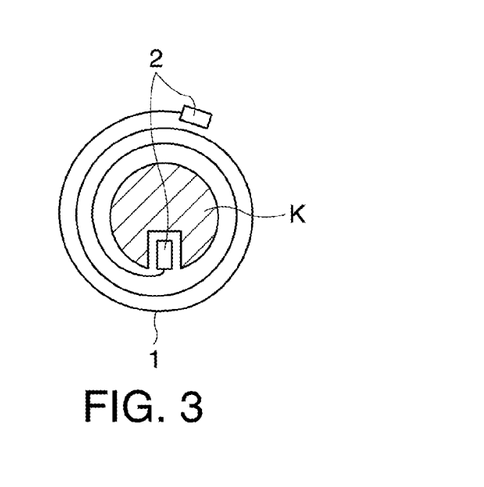
FIG. 3 is a side view schematically illustrating a stored condition of the screen unit according to the first embodiment.

Exemplary embodiments according to the invention are hereinafter described in detail with reference to the drawings.
First Embodiment FIGS. 1A and 1B schematically illustrate the structure of a screen unit S1. FIG. 1A is a perspective view of a surface (front side) of the screen unit S1 on which an image is projected from a projector, and FIG. 1B is a perspective view of the back surface of the screen unit S1. FIG. 2 is a perspective view illustrating a disassembled condition of the screen unit S1. FIG. 3 is a side view showing a stored condition of the screen unit S1.

FIGS. 1A and 1B illustrate the condition of the screen unit S1 during use according to a first embodiment of the invention. The screen unit S1 includes a rectangular screen 1, first supporting units 2 fixed to a pair of the upper and lower sides of the four sides of the screen 1, second supporting units 3 fixed to a pair of the left and right sides via second bar-shaped members 6b (FIG. 4) as fixing assist members, first tensioning units 4 for applying tension in the direction of separating the first supporting units 2, 2 away from each other, and second tensioning units 5 for applying tension in the direction of separating the second supporting units 3, 3 away from each other.

As illustrated in FIG. 2, one of the first supporting units 2 has two first supporting members 2a and 2b formed by hollow rectangular aluminum pipes. The screen 1 is sandwiched between the first supporting member 2a disposed on the front side (image projection surface side) and the first supporting member 2b disposed on the back side, and the two first supporting members 2a and 2b are fixed to the screen 1 by an adhesive. As illustrated in FIG. 3, the screen 1 to which only the first supporting units 2 are fixed is wound around a package unit K made of styrene foam or the like for storage and carriage.

The procedures performed for assembly from the condition of storage shown in FIG. 3 to the condition of use shown in FIGS. 1A and 1B are now sequentially explained.

Figure 4:
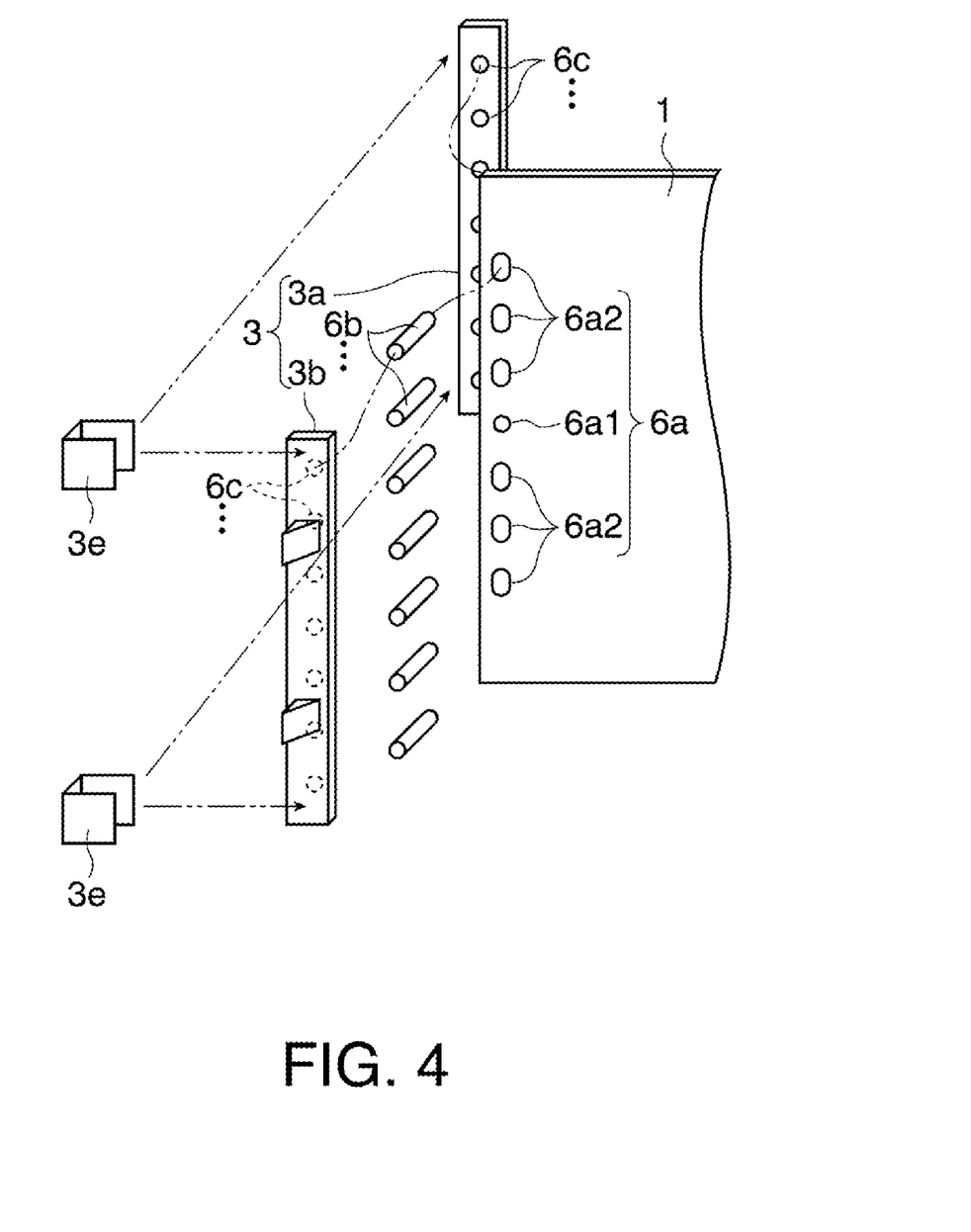
FIG. 4 is a partial enlargement illustrating the structure of an attachment portion of a second supporting unit according to the first embodiment.

Initially, the condition of storage shown in FIG. 3 is spread into the condition shown in FIG. 2. A plurality of second holes 6a are formed on each of the left and right sides of the screen 1. The plural second holes 6a are provided at intervals of approximately 100 mm along the left and right sides of the screen 1, and have opening shapes elongated in the direction of separating the first supporting units 2, 2 away from each other as illustrated in FIG. 2. The plural second holes 6a are not required to have uniform shapes. For example, as illustrated in FIG. 4, a second hole 6a1 located at the intermediate position in the up-down direction of the screen 1 may have an opening shape close to a perfect circle, and second holes 6a2 as the other second holes may have elongated opening shapes as mentioned above. According to this structure, the screen 1 and the second supporting units 3 can be separately expanded and contracted when the amount of expansion and contraction of the screen 1 is different from that amount of the second supporting units 3. In addition, shift of the relative positions of the screen 1 and the second supporting units 3 can be avoided.

As illustrated in FIG. 2, one of the second supporting units 3 has two second supporting members 3a and 3b formed by hollow rectangular aluminum pipes, and the screen is sandwiched between the second supporting member 3a disposed on the front side and the second supporting member 3b disposed on the back side. As illustrated in FIG. 4, holes 6c are formed on each of the second supporting members 3a and 3b at positions corresponding to the positions of the plural second holes 6a. For assembly, the second bar-shaped members 6b are inserted through the holes 6c on the second supporting member 3a, the second holes 6a on the screen 1, and the holes 6c on the second supporting member 3b in this order. The second supporting members 3a and 3b are fixed to each other without separation by using U-shaped fixtures 3e made of resin.

The second bar-shaped members 6b may be fixed to the second supporting member 3a by an adhesive or the like to be combined with the second supporting member 3a as one body. This structure eliminates the labor for assembling the plural second bar-shaped members 6b one by one, and thus facilitates assembly of the screen unit S1.

Figure 5A:
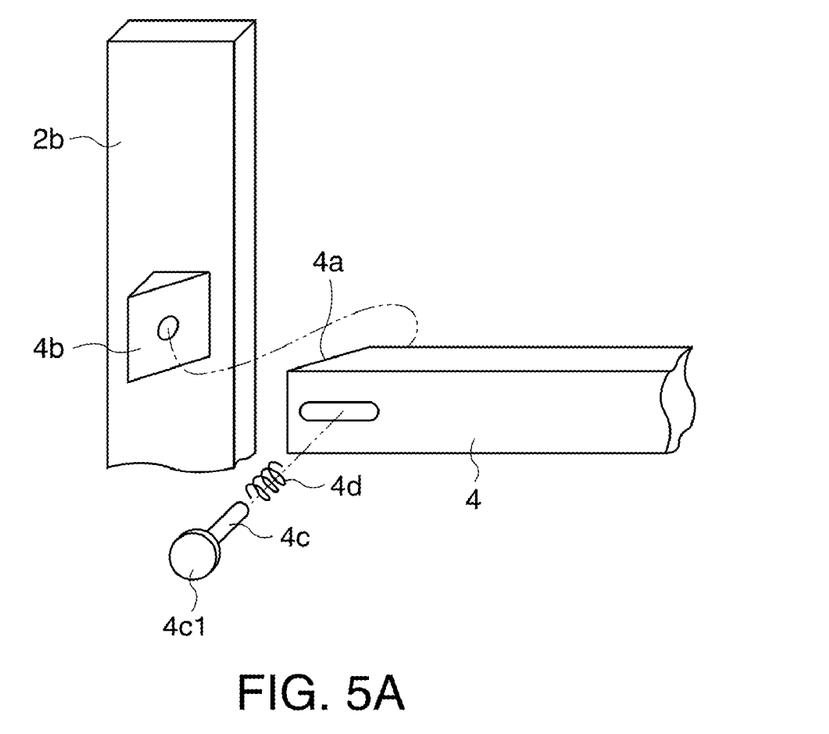
FIGS. 5A and 5B are partial enlargements illustrating the structure of a portion of a second tensioning unit attached to the screen unit according to the first embodiment.
Figure 5B:
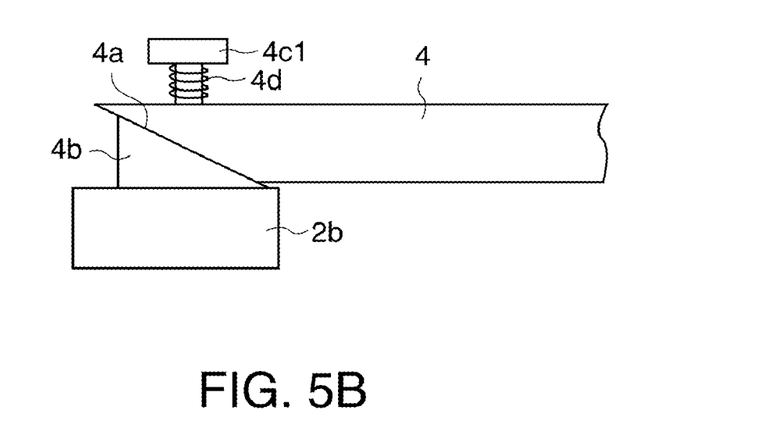

As illustrated in FIG. 2, one of the first tensioning units 4 formed by hollow rectangular aluminum pipes has inclined portions 4a at both ends. Inclined portions 4b made of resin are fixed to the first supporting members 2b by an adhesive. The inclined portions 4a and the inclined portions 4b are assembled such that the inclined surfaces of the inclined portions 4a and the inclined surfaces of the inclined portions 4b come into contact with each other. As illustrated in FIGS. 5A and 5B, each of the portions where the inclined surfaces contact each other has a structure allowing contact bonding by using a screw 4c. The pressure applied by the screw 4c is converted by the inclined portions 4a and 4b into tension in the longitudinal direction of the first tensioning units 4 as the direction of separating the first supporting units 2, 2 away from each other.

It is preferable that an elastic member 4d is inserted between a head 4c1 of the screw 4c and the first tensioning unit 4 as illustrated in FIGS. 5A and 5B. As can be seen from FIGS. 5A and 5B, the elastic member 4d is a spring in this embodiment. According to this structure, the force applied by the first tensioning unit 4 in the direction of separating the first supporting units 2, 2 away from each other can be kept substantially constant under the approximately constant pressure continuously given by the elastic member 4d when the screen 1 is expanded by thermal expansion, for example. As a result, the flatness of the screen 1 can be maintained.

As illustrated in FIG. 2, one of the second tensioning units 5 formed by hollow rectangular aluminum pipes has inclined portions 5a at both ends. Inclined portions 5b made of resin are fixed to the second supporting members 3b by an adhesive. The inclined portions 5a and the inclined portions 5b are assembled such that the inclined surfaces of the inclined portions 5a and the inclined surfaces of the inclined portions 5b come into contact with each other. Though not shown in the figure, the portions where the inclined surfaces contact each other are assembled by the same method as the method for assembling the portions of the inclined surfaces contacting each other in case of the first tensioning units 4 shown in FIG. 5 so as to apply tension in the direction of separating the second supporting units 3, 3 away from each other.

For storing and carrying the screen unit S1, the screen unit S1 is disassembled by the same procedures as those of the assembly described above but performed in the reverse order to return to the condition shown in FIG. 3.

Second Embodiment

A screen unit according to a second embodiment is now explained. A screen unit S2 in the second embodiment is a modification of the screen unit S1 in the first embodiment, and the parts not particularly touched upon herein are similar to the corresponding parts in the first embodiment.

Figure 6:
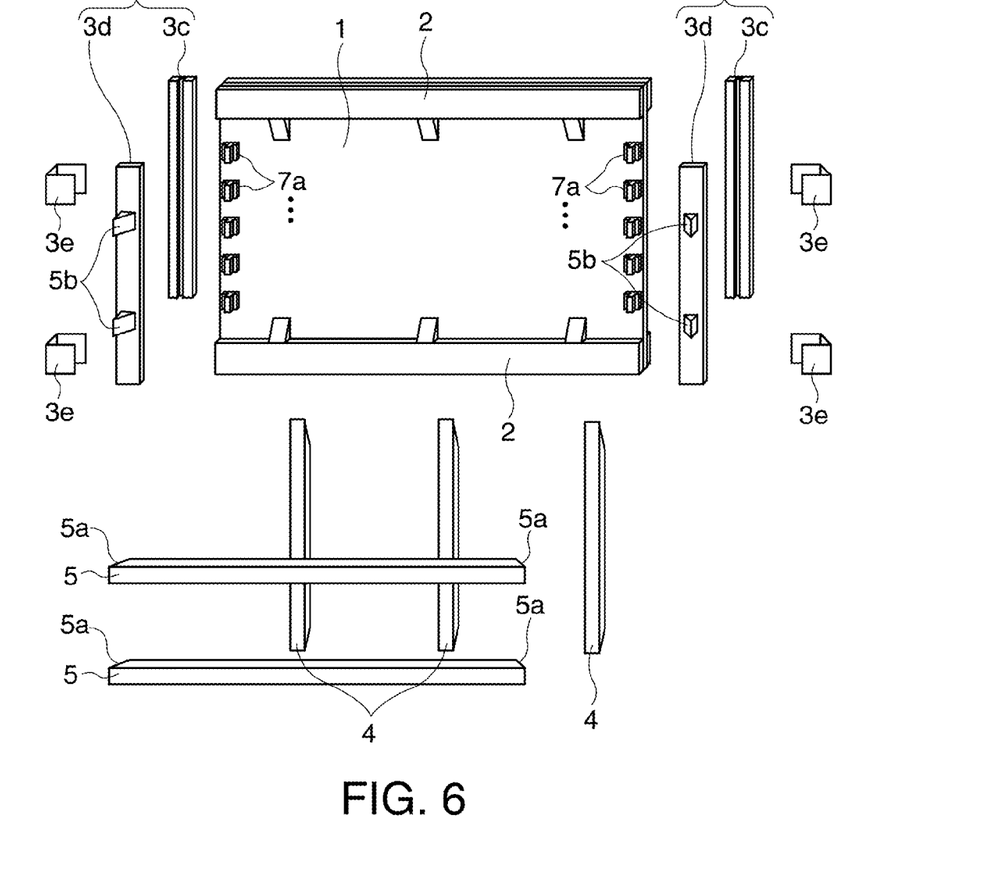
FIG. 6 is a perspective view schematically illustrating a disassembled condition of the screen unit according to the second embodiment.
Figure 7:
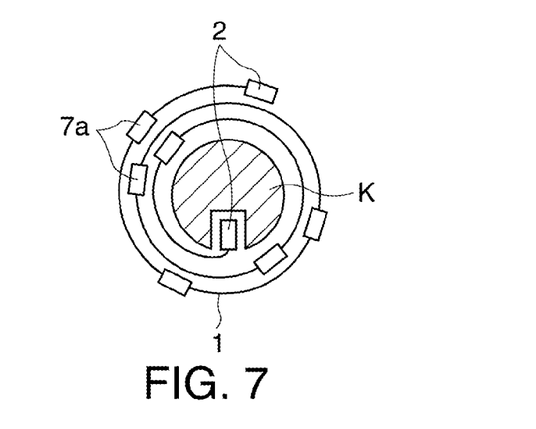
FIG. 7 is a side view schematically illustrating a stored condition of the screen unit according to the second embodiment.

FIGS. 1A and 1B schematically illustrate the structure of the screen unit S2. FIG. 6 is a perspective view illustrating a disassembled condition of the screen unit S2. FIG. 7 is a side view illustrating a stored condition of the screen unit S2.

Figure 8:
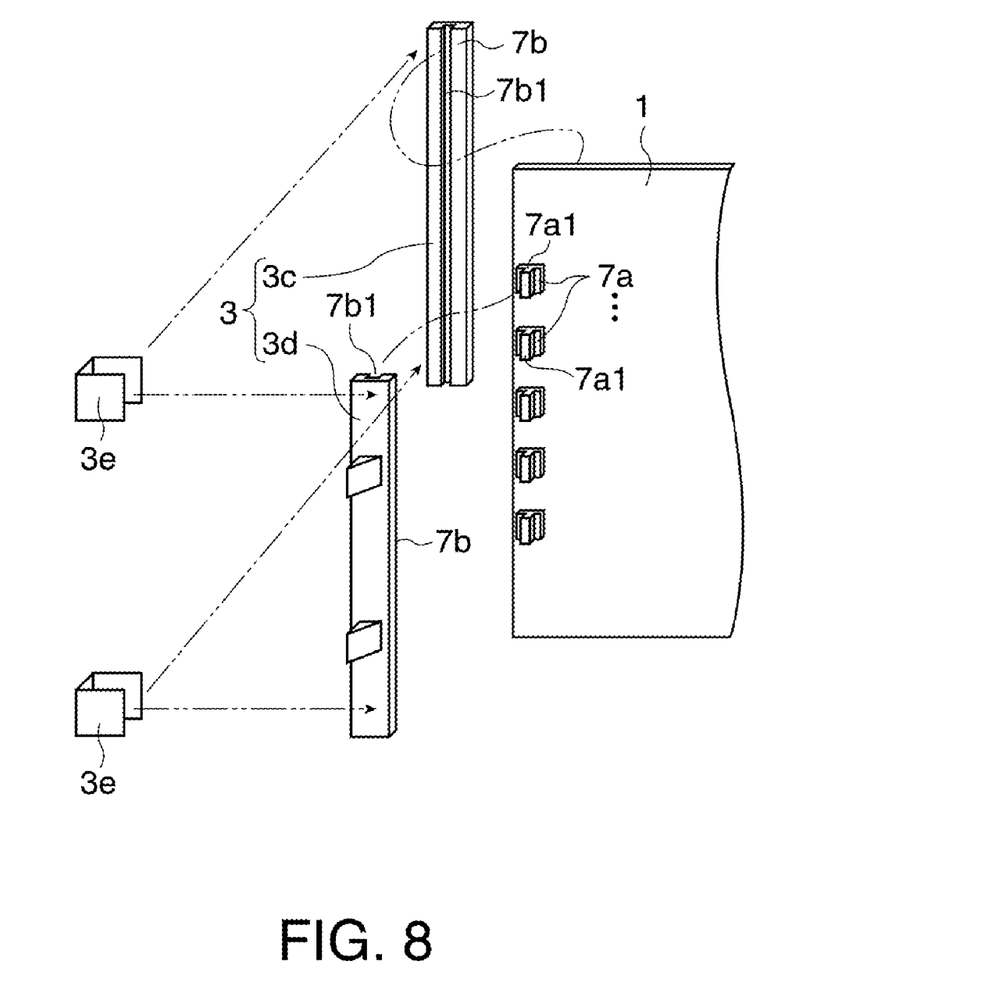
FIG. 8 is a partial enlargement illustrating the structure of an attachment portion of a second supporting unit according to the second embodiment.

As illustrated in FIG. 6, a plurality of first slip stoppers 7a as fixing assist members are provided on the pair of the left and right sides of the screen 1. The plural first slip stoppers 7a are fixed by an adhesive at intervals of approximately 100 mm along the left and right sides of the screen 1. While only the first slip stoppers 7a on the back side of the screen 1 are shown in the figure, the first slip stoppers 7a are provided on the front side in the same manner as on the back side. The first slip stopper 7a is made of elastic material (rubber in this embodiment), and has a convex portion 7a1 as illustrated in FIG. 8. The convex portion 7a1 on the first slip stoppers 7a is disposed in parallel with the direction of separating the first supporting units 2, 2 away from each other.

As illustrated in FIG. 6, one of the second supporting units 3 has two second supporting members 3c and 3d formed by hollow rectangular aluminum pipes, and the screen is sandwiched between the second supporting member 3c disposed on the front side and the second supporting member 3d disposed on the back side. As illustrated in FIG. 8, a second slip stopper 7b provided on each of the second supporting members 3c and 3d on the screen 1 side has a concave portion 7b1 having a shape corresponding to the shapes of the first slip stoppers 7a.

The concave portion 7b1 is formed at the time of extrusion molding of the second supporting members 3c and 3d. For assembling the second supporting unit 3, the convex portion 7a1 of the first slip stopper 7a provided on the screen 1 is joined with the concave portion 7b1 of the second slip stopper 7b provided on the second supporting unit 3. The second supporting members 3c and 3d are fixed to each other without separation by using the U-shaped fixtures 3e made of resin.

As illustrated in FIG. 6, one of the second tensioning units 5 has the inclined portions 5a, and each of the second supporting members 3d has the inclined portions 5b made of resin and fixed to the second supporting member 3d by an adhesive. For assembly, the inclined portions 5a are connected with the inclined portions 5b such that the inclined surfaces of the inclined portions 5a contact the inclined surfaces of the corresponding inclined portions 5b. Though not shown in the figure, the portions where the inclined surfaces contact each other in this structure are assembled by a method similar to the method used for assembling the inclined surfaces of the first tensioning units 4 contacting each other as illustrated in FIGS. 5A and 5B so as to apply tension in the direction of separating the second supporting units 3, 3 away from each other.

Third Embodiment

A screen unit according to a third embodiment is now explained. A screen unit S3 in the third embodiment is a modification of the screen unit S1 in the first embodiment, and the parts not particularly touched upon herein are similar to the corresponding parts in the first embodiment.

Figure 9:
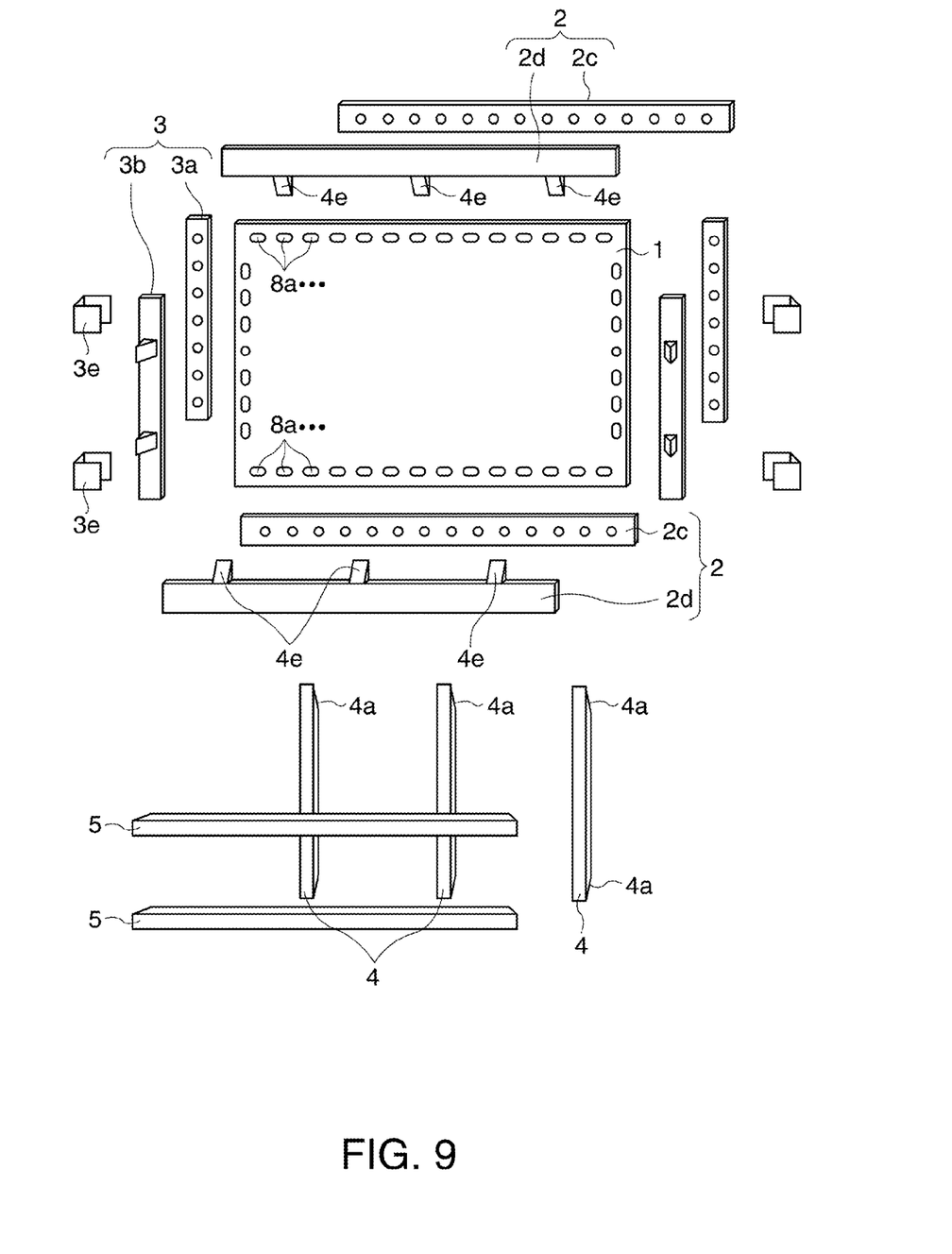
FIG. 9 is a perspective view schematically illustrating a disassembled condition of the screen unit according to the third embodiment.

FIGS. 1A and 1B schematically illustrate the structure of the screen unit S3. FIG. 9 shows the disassembled screen unit S3.

Figure 10:
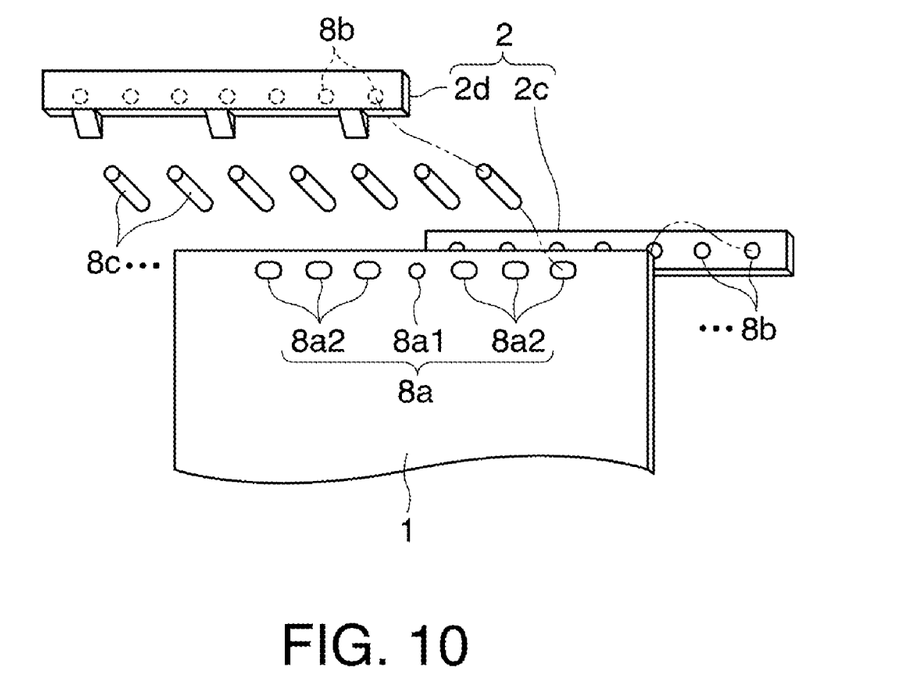
FIG. 10 is a partial enlargement illustrating the structure of an attachment portion of a first supporting unit according to the third embodiment.

As illustrated in FIG. 9, a plurality of first holes 8a are formed on each of the pair of the upper and lower sides of the screen 1. The plural first holes 8a are disposed at intervals of approximately 100 mm along the upper and lower sides of the screen 1, and have opening shapes elongated in the direction of separating the second supporting units 3, 3 away from each other. The plural second holes 8a are not required to have uniform shapes. For example, as illustrated in FIG. 10, a first hole 8a1 located at the intermediate position in the left-right direction of the screen 1 may have an opening shape close to a perfect circle, and first holes 8a2 as the other first holes may have elongated opening shapes as mentioned above. According to this structure, the screen 1 and the first supporting units 2 can be separately expanded and contracted when the amount of expansion and contraction of the screen 1 is different from that amount of the first supporting units 2. In addition, shift of the relative positions of the screen 1 and the first supporting units 2 can be avoided.

As illustrated in FIG. 9, one of the first supporting units 2 has two first supporting members 2c and 2d formed by hollow rectangular aluminum pipes. The screen 1 is sandwiched between the first supporting member 2c located on the front side and the first supporting member 2d located on the back side. As illustrated in FIG. 10, holes 8b are formed on each of the first supporting members 2c and 2d at positions corresponding to the positions of the plural first holes 8a. For assembly, first bar-shaped members 8c are inserted through the holes 8b on the first supporting member 2c, the first holes 8a on the screen 1, and the holes 8b on the first supporting member 2d in this order. The first bar-shaped members 8c are fixed to the holes 8b on the first supporting unit 2 by an adhesive.

As can be seen from FIG. 9, one of the first tensioning units 4 has the inclined portions 4a. Inclined portions 4e made of resin are fixed to each of the first supporting members 2d by an adhesive. The inclined portions 4a and the inclined portions 4e are assembled such that the inclined surfaces of the inclined portions 4a and the inclined surfaces of the inclined portions 4e contact each other. Though not shown in the figure, the portions where the inclined surfaces contact each other in this structure are assembled by the same method as the method for assembling the portions of the inclined surfaces contacting each other in case of the first tensioning units 4 in the first embodiment shown in FIGS. 5A and 5B so as to apply tension in the direction of separating the first supporting units 2, 2 away from each other.

As described above, the screen units S1, S2, and S3 in the respective embodiments include the supporting units 2 and 3 provided on the four sides of the rectangular screen 1, and the tensioning units 4 and 5 for applying tension in the directions of separating the first supporting units 2, 2 away from each other and separating the second supporting units 3, 3 away from each other. Accordingly, the flatness of the screen 1 increases, allowing an image having no distortion to be projected by a close projection type projector.

Moreover, the second supporting units 3 can be easily assembled. Thus, the package volume can be reduced during transportation of the screen units S1 through S3, which lowers the transportation cost.

The invention is not limited to the respective embodiments described herein. Various modifications and changes may be made by those skilled in the art in regard to the shapes, materials, numbers, and other detailed structures without departing from the scope of the invention.

For example, the second bar-shaped members may be formed integrally with one of the second supporting members.

The first bar-shaped members may be fixed to one of the first supporting members by an adhesive in advance, or molded to be formed integrally with one of the first supporting members.

The first bar-shaped members may be bar-shaped components formed by flat-plate-shaped elastic bodies, for example, which are more easily deformable in the tensioning direction of the first tensioning units than in the tensioning direction of the second tensioning units.

The second bar-shaped members may be bar-shaped components formed by flat-plate-shaped elastic bodies, for example, which are more easily deformable in the tensioning direction of the second tensioning units than in the tensioning direction of the first tensioning units.

One of the first tensioning units 4 may have only one inclined portion 4a. In this case, the end not having the inclined portion 4a may be fixed to the first supporting unit 2 by an adhesive or by a screw.

One of the second tensioning units 5 may have only one inclined portion 5a. In this case, the end not having the inclined portion 5a may be fixed to the second supporting unit 3 by an adhesive or by a screw.

What is claimed is:

1. A screen unit, comprising:
    a screen;
    fixing assist members provided on the screen along two opposed sides of the screen;
    first supporting units fixed to two sides of the screen different from the two opposed sides along which the fixing assist members are provided;
    second supporting units fixed to the screen via the fixing assist members;
    a first tensioning unit which applies a tension in a direction of separating the first supporting units away from each other;
    a second tensioning unit which applies a tension in a direction of separating the second supporting units away from each other; and
    first bar-shaped members that penetrate through a plurality of first holes formed at least along one of the two sides of the screen to which the first supporting units are fixed, the first bar-shaped members held by the first supporting units such that the first supporting units are fixable to the screen.

2. The screen unit according to claim 1, wherein the first holes have opening shapes elongated in the tensioning direction of the second tensioning unit.

3. The screen unit according to claim 1, wherein the first bar-shaped members are elastic bodies which are more easily deformable in the tensioning direction of the first tensioning unit than in the tensioning direction of the second tensioning unit.

4. A screen unit comprising:
    a screen;

fixing assist members provided on the screen along two opposed sides of the screen;
first supporting units fixed to two sides of the screen different from the two opposed sides along which the fixing assist members are provided;
second supporting units fixed to the screen via the fixing assist members;
a first tensioning unit which applies a tension in a direction of separating the first supporting units away from each other; and
a second tensioning unit which applies a tension in a direction of separating the second supporting units away from each other,
wherein the fixing assist members are second bar-shaped members, the second bar-shaped members penetrating through a plurality of second holes formed along the two opposed sides of the screen to which the second supporting units are fixed, the second bar-shaped members being held by the second supporting units such that the second supporting units are fixable to the screen.

5. The screen unit according to claim 4, wherein the second holes have opening shapes elongated in the tensioning direction of the first tensioning unit.

6. The screen unit according to claim 4, wherein the second bar-shaped members are elastic bodies which are more easily deformable in the tensioning direction of the second tensioning unit than in the tensioning direction of the first tensioning unit.

7. A screen unit comprising:
a screen;
fixing assist members provided on the screen along two opposed sides of the screen;
first supporting units fixed to two sides of the screen different from the two opposed sides along which the fixing assist members are provided;
second supporting units fixed to the screen via the fixing assist members;
a first tensioning unit which applies a tension in a direction of separating the first supporting units away from each other; and
a second tensioning unit which applies a tension in a direction of separating the second supporting units away from each other,
wherein one of the fixing assist members has a first slip stopper provided on the screen and a second slip stopper provided on the second supporting unit.

8. A screen unit comprising:
a screen;
fixing assist members provided on the screen along two opposed sides of the screen;
first supporting units fixed to two sides of the screen different from the two opposed sides along which the fixing assist members are provided;
second supporting units fixed to the screen via the fixing assist members;
a first tensioning unit which applies a tension in a direction of separating the first supporting units away from each other; and
a second tensioning unit which applies a tension in a direction of separating the second supporting units away from each other,
wherein the first tensioning unit includes a first plate-shaped member having a first inclined portion and the screen is tensioned by applying a pressure to the first inclined portion.

9. A screen unit comprising:
a screen;
fixing assist members provided on the screen along two opposed sides of the screen;
first supporting units fixed to two sides of the screen different from the two opposed sides along which the fixing assist members are provided;
second supporting units fixed to the screen via the fixing assist members;
a first tensioning unit which applies a tension in a direction of separating the first supporting units away from each other; and
a second tensioning unit which applies a tension in a direction of separating the second supporting units away from each other,
wherein the second tensioning unit includes a second plate-shaped member having a second inclined portion and the screen is tensioned by applying a pressure to the second inclined portion.

* * * * *